(12) United States Patent
Johnson

(10) Patent No.: US 7,188,467 B2
(45) Date of Patent: Mar. 13, 2007

(54) METHODS AND APPARATUS FOR ASSEMBLING A GAS TURBINE ENGINE

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 10/955,614

(22) Filed: Sep. 30, 2004

(65) Prior Publication Data

US 2006/0064961 A1    Mar. 30, 2006

(51) Int. Cl.
*F02K 3/02*    (2006.01)

(52) U.S. Cl. ........................... 60/226.1; 60/262

(58) Field of Classification Search ............... 60/262, 60/762, 226.1, 226.3
See application file for complete search history.

(56) References Cited

U.S. PATENT DOCUMENTS

| 5,402,638 | A | | 4/1995 | Johnson |
|---|---|---|---|---|
| 5,435,127 | A | * | 7/1995 | Luffy et al. ............... 60/204 |
| 5,623,823 | A | * | 4/1997 | Schirle et al. ............. 60/226.3 |
| 5,694,768 | A | | 12/1997 | Johnson et al. |
| 5,813,221 | A | * | 9/1998 | Geiser et al. .............. 60/762 |
| 5,867,980 | A | * | 2/1999 | Bartos ...................... 60/226.3 |
| 6,195,983 | B1 | * | 3/2001 | Wadia et al. .............. 60/226.1 |
| 6,415,609 | B1 | * | 7/2002 | Vacek et al. ............... 60/761 |
| 6,442,930 | B1 | * | 9/2002 | Johnson et al. ........... 60/226.1 |
| 6,550,235 | B2 | * | 4/2003 | Johnson et al. ........... 60/204 |
| 6,666,018 | B2 | * | 12/2003 | Butler et al. ............... 60/226.1 |
| 6,868,665 | B2 | * | 3/2005 | Koshoffer et al. ......... 60/247 |
| 6,883,302 | B2 | * | 4/2005 | Koshoffer .................. 60/204 |
| 6,983,586 | B2 | * | 1/2006 | Tangirala et al. .......... 60/39.77 |
| 6,983,601 | B2 | * | 1/2006 | Koshoffer .................. 60/761 |
| 7,140,174 | B2 | * | 11/2006 | Johnson ..................... 60/226.1 |
| 2005/0081509 | A1 | * | 4/2005 | Johnson ..................... 60/226.1 |
| 2005/0144932 | A1 | * | 7/2005 | Cohen et al. ............... 60/204 |
| 2006/0032230 | A1 | * | 2/2006 | Freese et al. ............... 60/761 |
| 2006/0042227 | A1 | * | 3/2006 | Coffinberry ............... 60/226.1 |

* cited by examiner

*Primary Examiner*—William H. Rodriguez
(74) *Attorney, Agent, or Firm*—William Scott Andes; Armstrong Teasdale LLP

(57) ABSTRACT

A method for assembling a gas turbine engine includes providing a core engine, and providing a flade system including a flade stream augmentor positioned within a flade duct. The method also includes channeling airflow through the core engine to produce engine thrust, channeling airflow through the flade duct to produce engine thrust, and igniting a portion of the airflow channeled through the flade duct using the flade stream augmentor to increase the amount of thrust produced by the flade system.

18 Claims, 2 Drawing Sheets

METHODS AND APPARATUS FOR ASSEMBLING A GAS TURBINE ENGINE

BACKGROUND OF THE INVENTION

This invention relates generally to gas turbine engines and more particularly, to methods and apparatus for assembling fladed engines.

Variable cycle engines are conventionally known for powering high performance aircraft from subsonic to supersonic speeds while attempting to obtain countervailing objectives such as high specific thrust and low fuel consumption. In other words, ideal aircraft jet engines attempt to operate through various modes of thrust and speed requirements while minimizing fuel consumption.

Known variable cycle engines are generally operable over a range of operating conditions. In particular, conventional variable cycle combined turbojet or turbofan and ramjet engines generally attempt to provide for a range of operation from low subsonic Mach numbers to high supersonic Mach numbers of about Mach 6. However such turbofan-ramjet engines are relatively complex and generally include varying disadvantages. For example, at least one known turbofan-ramjet engine includes a ram burner which is wrapped around a core engine, thus creating an undesirably large diameter engine.

Other known variable cycle engines include variable coannular exhaust nozzles that are relatively complex and difficult to schedule the flow area thereof. Additionally, these known engines have a high level of base drag associated with the exhaust nozzles. Moreover, other known variable cycle engines include coannular, separate flow paths including a coannular inlet which creates an undesirably large inlet and which typically requires an inlet diverter valve for selectively channeling inlet air flow. These known engines may have high levels of spillage around the engine inlet. Other known engines may include one or more of such undesirable structures, thus resulting in an engine that is relatively complex, heavy, large, and inefficient.

BRIEF SUMMARY OF THE INVENTION

In one aspect, a method is provided for operating a gas turbine engine. The method includes providing a core engine, and providing a flade system including a flade stream augmentor positioned within a flade duct. The method also includes channeling airflow through the core engine to produce engine thrust, channeling airflow through the flade duct to produce engine thrust, and igniting a portion of the airflow channeled through the flade duct using the flade stream augmentor to increase the amount of thrust produced by the flade system.

In another aspect, a flade system for a gas turbine engine is provided. The gas turbine engine includes a core engine including an inner fan duct for channeling airflow through a portion of the core engine, and at least one inner fan section including at least one row of inner fan blades positioned in the inner fan duct. The engine also includes a flade system including a flade duct surrounding the inner fan duct and defining a flade stream, at least one fladed fan positioned in the flade duct and producing a flade stream airflow, wherein the fladed fan includes at least one row of fladed fan blades radially outward of and coupled to the inner fan section such that the fladed fan blades are driven by the inner fan section, and a flade stream augmentor positioned within the flade duct.

In a further aspect, a gas turbine engine is provided. The gas turbine engine includes a core engine including an inner fan duct for channeling airflow through a portion of the core engine, and at least one inner fan section including at least one row of inner fan blades positioned in the inner fan duct. The engine also includes a flade system including a flade duct surrounding the core engine and defining a flade stream, at least one fladed fan positioned in the flade duct and producing a flade stream airflow, wherein the fladed fan includes at least one row of fladed fan blades radially outward of and coupled to the inner fan section such that the fladed fan blades are driven by the inner fan section, and a flade stream augmentor positioned within the flade duct.

DETAILED DESCRIPTION OF THE INVENTION

Figure 1:
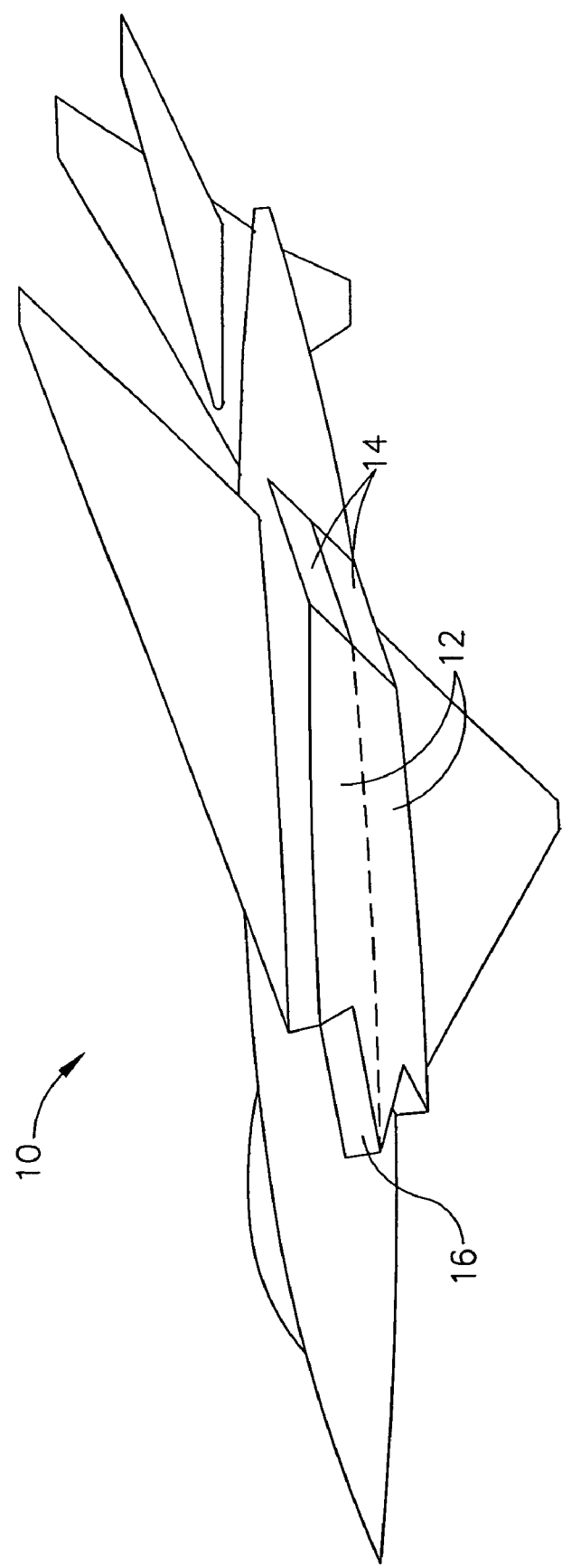
FIG. 1 is an end view of an aircraft including an exemplary engine.

FIG. 1 is a schematic illustration of a jet aircraft 10 including a plurality of engines 12 and a plurality of nozzle assemblies 14. Aircraft 10 includes an aircraft inlet 16 for channeling airflow to engines 12.

Figure 2:
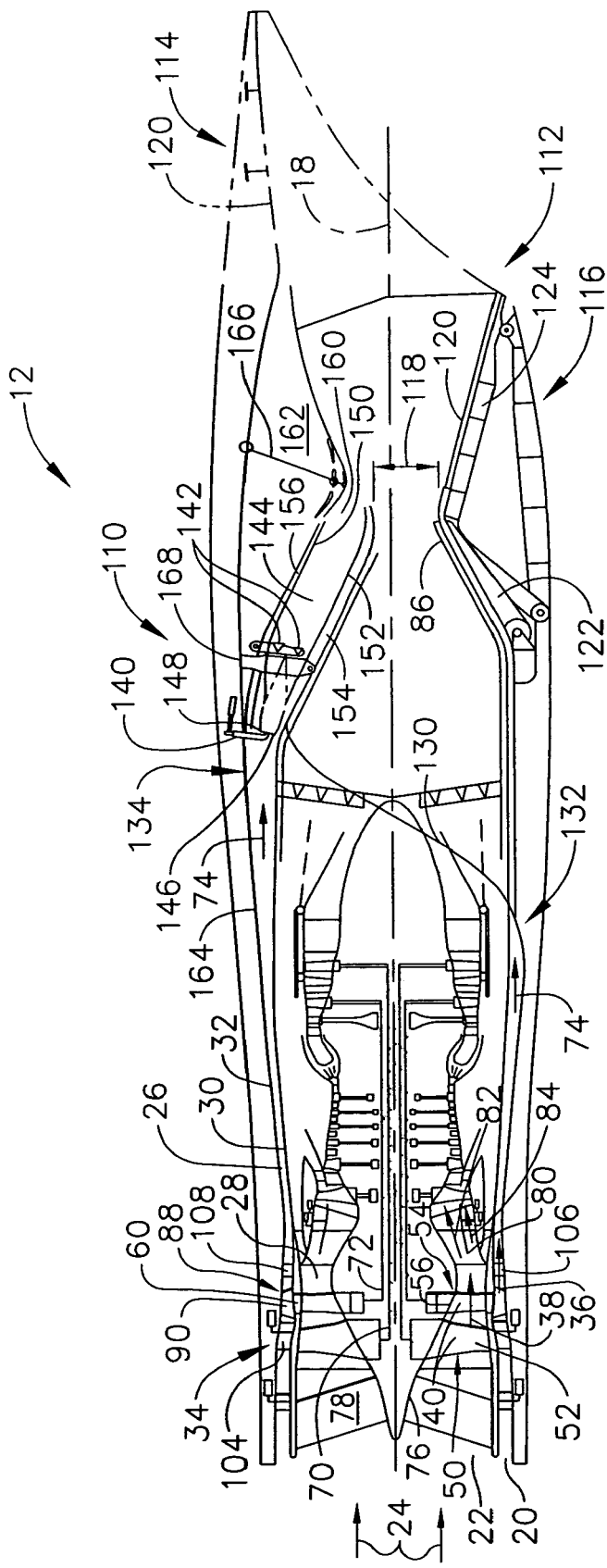
FIG. 2 is a schematic illustration of an exemplary fladed engine that may be used with the aircraft shown in FIG. 1.

FIG. 2 is a schematic illustration of an exemplary "fan-on-blade" or fladed engine 12 having an axially oriented engine centerline axis 18. Engine 12 includes a flade inlet 20 and an inner fan inlet 22 through which engine inlet airflow 24 enters during engine operations. In the exemplary embodiment, airflow 24 entering flade inlet 20 flows along a flade duct 26, and airflow 24 entering inner fan inlet 22 flows along an inner fan duct 28. Flade inlet 20 facilitates capturing additional airflow 24 that would otherwise spill around engine 12 leading to spillage drag losses on engine 12. Accordingly, the airflow captured by flade inlet 20 is channeled through engine 12 to improve engine 12 performance by increasing thrust through additional exhaust. Moreover, the airflow captured by flade inlet 20 is channeled by flade duct 26 to facilitate cooling portions of engine 12.

In the exemplary embodiment, fan duct 28 is defined by a fan casing 30 that extends circumferentially around the core engine along centerline axis 18 from fan inlet 22. Fan casing 30 separates fan duct 28 and flade duct 26. As such, flade duct 26 is defined by fan casing 30 and a flade casing 32, positioned radially outward from fan casing 30. Fan duct 28 and flade duct 26 channel airflow 24 through a fan assembly 34 wherein airflow 24 is compressed and discharged downstream as flade discharge airflow 36 and fan discharge airflow 38. Discharge airflows 36 and 38 facilitate generating thrust to power engine 12.

Fan assembly 34 includes a plurality of fan blades 40. Each fan blade 40 includes a leading edge and a trailing edge and extends radially between a root and a tip. In the exemplary embodiment, fan blades 40 are arranged in a two-stage configuration such that fan assembly 34 includes a first fan stage 50 having a first row 52 of circumferentially-spaced fan blades 40, and a second fan stage 54 having a second row 56 of circumferentially-spaced fan blades 40. In an alternative embodiment, fan assembly 34 includes more or less than two fan stages and includes more or less than two rows of fan blades.

A shroud 60 extends circumferentially around, and is coupled to, each fan blade tip within second stage 54. In one embodiment, shroud 60 is a single annular member that is coupled to each fan blade tip within second stage 54. In another embodiment, fan assembly 34 includes a plurality of tip shrouded airfoils such that shroud 60 includes a plurality of arcuate members each coupled to at least one fan blade tip such that the arcuate members extend circumferentially around second stage 54. Specifically, each arcuate member is positioned adjacent other arcuate members to facilitate reducing an amount of air transfer between flade stream 26 and fan duct 28. Shroud 60 facilitates preventing airflow flowing from fan duct 28 to flade duct 26, or vice-versa. In an alternative embodiment, shroud 60 is coupled to another stage, such as, for example, first stage 50.

In the exemplary embodiment, fan assembly 34 is a counter rotating fan assembly such that first stage 50 is rotatably coupled to, and driven by, a first shaft 70, and second stage 54 is rotatably coupled to, and driven by, a second shaft 72. First and second shafts 70 and 72 operate independently with respect to each other, such that first shaft 70 operates with a first rotational speed that is different than a second rotational speed of second shaft 72. Accordingly, first stage 50 and second stage 54 have different operational speeds. In the exemplary embodiment, second shaft 72 rotates in an opposite direction than first shaft 70. In an alternative embodiment, first stage 50 and second stage 54 operate in the same rotational direction.

A fan stream 74 flows through fan duct 28. Specifically, fan stream 74 enters engine 12 at fan inlet 22 and flows between fan casing 30 and a rotor hub 76. In operation, fan stream 74 is channeled through a plurality of inlet guide vanes 78 towards first stage 50 between fan casing 30 and hub 76. As fan stream 74 is channeled through first row 52 of fan blades 40, the density of fan stream 74 is increased. Fan stream 74 is then channeled through second row 56 of fan blades 40 wherein the density of fan stream 74 is further increased. Once fan stream 74 is channeled through fan assembly 34, the airflow is divided by a splitter 80 into a core stream 82 and a bypass stream 84. More specifically, splitter 80 is oriented downstream of fan assembly 34 to facilitate dividing fan stream 74 to enable engine 12 to meet engine overall performance requirements relating to thrust and airflow pressure ratios. Core stream 82 continues through the core engine towards a downstream end 86 of fan duct 28. Additionally, bypass stream 84 continues through fan duct 28 towards downstream end 86. In the exemplary embodiment, core and bypass streams 82 and 84 are mixed together upstream of downstream end 86 prior to the addition of fuel to the mixture. The fuel-air mixture is then ignited by a plurality of augmentors 87 prior to being exhausted through downstream end 86.

In the exemplary embodiment, fan assembly 34 also includes a fladed fan assembly 88 that includes a plurality of fladed rotor blades 90 positioned within flade duct 26. Each fladed blade 90 includes a leading edge and a trailing edge and extends radially between a root and a tip. In the exemplary embodiment, fladed blades 90 are arranged in a row that extends circumferentially around shroud 60. Fladed blades 90 produce flade discharge airflow 36 that is channeled through flade duct 26.

Each fladed blade 90 is drivenly coupled to shroud 60 at blade root 96 and extends radially outward from shroud 60. In one embodiment, each fladed blade 90 is coupled to shroud 60 via, for example, a welding process, such as, but not limited to, an inductive welding process. In another embodiment, fladed blades 90 are unitarily formed with shroud 60. Fladed blades 90 have a radial height extending between the blade root and the blade tip 98, that is selected to facilitate improving an efficiency potential of flade stream 74, while reducing the risk of exceeding tip speed constraints.

A row of circumferentially spaced variable area inlet guide vanes 104 are positioned within flade duct 26 upstream of fladed blades 90. Inlet guide vanes are operable to channel airflow towards fladed blades 90 and meter the volume of airflow entering flade stream 26. As the airflow is channeled through fladed blades 90 the airflow is compressed. The airflow discharged from fladed blades 90 passes through a row 106 of circumferentially spaced outlet guide vanes 108 which change the direction of the airflow to facilitate reducing the rotary velocity component of the airflow. Flade stream 26 is then channeled downstream through flade duct 26 prior to being exhausted. Accordingly, flade stream 26 increases an amount of high pressure airflow available, thus facilitating increasing the overall performance and/or thrust of engine 12.

In the exemplary embodiment, engine 12 includes a flade stream augmentor 110 to facilitate increasing the thrust output, and therefore the overall performance of engine 12. Augmentor 110 is positioned in flade duct 26 such that a portion of flade stream 74 is mixed with a fuel, ignited and then exhausted downstream of augmentor 110. Specifically, flade stream 74 is exhausted into a nozzle assembly 112 positioned at a downstream end of engine 12. Additionally, the discharge airflow from fan duct 28 is exhausted into nozzle assembly 112. Accordingly, the discharge from flade and fan ducts 26 and 28 are mixed in nozzle assembly 112 and exhausted from engine 12. In the exemplary embodiment, nozzle assembly 112 includes an upper nozzle section 114 and a lower nozzle section 116. A throat area 118 is defined by the inner surface of a nozzle liner 120 between the upper and lower nozzle sections 114 and 116. Additionally, a front flap 122 and a rear flap 124 are coupled to lower nozzle section 116 and are moveable such that throat area 118 is variable. Specifically, throat area 118 is increased and/or decreased depending on the mode of operation and/or the required thrust output of engine 12.

Flade duct 26 includes a flade duct scroll 130 that channels a portion of flade stream 74 from a lower flade section 132 to an upper flade section 134. A portion of flade duct 26 continues downstream from flade duct scroll 130 such that flade stream 74 in that portion facilitates cooling fan casing 30 and/or nozzle assembly 112 proximate the downstream end of engine 12. In one embodiment, by way of example only, approximately 20%–30% of flade stream 74 continues downstream of flade duct scroll 130 in the corresponding flade duct 26. In other embodiments, more or less of flade stream 74 continues downstream of flade duct scroll 130 to facilitate improving the cooling potential of flade duct 26. In the exemplary embodiment, flade duct scroll 130 extends to upper flade section 134 and is positioned upstream of augmentor 110. Specifically, flade duct scroll 130 channels flade stream 74 upstream of augmentor 110 to facilitate increasing the amount of flade stream 74 airflow that enters augmentor 110 for ignition. As such, the overall thrust potential of engine 12 is increased.

Augmentor 110 includes a fuel spraybar 140, a plurality of burners 142, and a burner cavity 144 extending downstream from burners 142. An inlet 146 is positioned at an upstream end 148 of augmentor 110 and is defined by an inner burner cavity liner 150 and an outer burner cavity liner 152. Outer liner 152 is positioned radially outward from inner liner 150 and defines burner cavity 144 therebetween.

Additionally an inner flade bypass duct 154 extends between inner liner 150 and fan casing 30, and an outer flade bypass duct 156 extends between outer liner 152 and flade casing 32. Flade bypass ducts 154 and 156 facilitate channeling the excess flade stream 74 airflow around augmentor 110. Additionally, flade bypass ducts 154 and 156 facilitate channeling a portion of flade stream 74 around augmentor 110 for cooling burner cavity 144 and/or fan duct 28.

In the exemplary embodiment, fuel spray bar 140 delivers fuel to augmentor 110 to mix with the air in flade stream 74. Specifically, the fuel is mixed with the portion of flade stream 74 entering augmentor inlet 146. Burners 142 are positioned downstream of spray bar 140 and facilitate igniting and/or maintaining ignition of the fuel air mixture. Once ignited, the fuel-air mixture expands and the temperature is increased to facilitate increasing the overall thrust produced by engine 12. The hot gas produced is channeled through a flade burner throat 160 into the nozzle assembly 112. Specifically, the hot gas is channeled into a common secondary nozzle system to facilitate filling the nozzle base area and reduce nozzle base drag.

In one embodiment, a cooling cavity 162 is formed between flade casing 32 and a radially outer engine casing 164. Flade casing 32 is supported by a strut 166 extending between engine casing 164 and flade casing 32. In the exemplary embodiment, strut 166 controls the area defined by flade burner throat 160. Flade casing 32 is also supported by a support member 168. In the exemplary embodiment, support member 168 extends between engine casing 164 and fan casing 30 to facilitate supporting fan casing 30, inner liner 150, outer liner 152, and flade casing 32. In one embodiment, burners 142 are coupled to support member 168 between inner and outer burner cavity liners 150 and 152.

The above-described fladed engines are cost-effective and highly reliable. The fladed engine includes a flade stream for capturing a portion of the airflow spilled around fan inlet. The increased airflow through the engine increases the amount of thrust generated by the engine. Additionally, the engine includes a flade duct scroll for channeling a significant portion of the airflow upstream of a flade stream augmentor. As a result, a portion of the flade stream is ignited to produce additional thrust generation by the engine, thereby increasing the engines overall performance.

Exemplary embodiments of fladed engines are described above in detail. The fladed engines are not limited to the specific embodiments described herein, but rather, components of each fladed engine may be utilized independently and separately from other components described herein. For example, each fladed engine component can also be used in combination with other fladed engine components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a core engine including an inner fan duct for channeling airflow through a portion of the core engine, and at least one inner fan section including at least one row of inner fan blades positioned in the inner fan duct;

providing a flade system including a flade duct surrounding the core engine and defining a flade stream, at least one fladed fan positioned in the flade duct and producing a flade stream airflow, wherein the fladed fan includes at least one row of fladed fan blades radially outward of and coupled to the inner fan section such that the fladed fan blades are driven by the inner fan section, and a flade stream augmentor positioned within the flade duct;

channeling airflow through the core engine to produce engine thrust;

channeling airflow through the flade duct to produce engine thrust;

igniting a portion of the airflow channeled through the flade duct using the flade stream augmentor to increase the amount of thrust produced by the flade system.

2. A method in accordance with claim 1 wherein the flade system includes a flade duct scroll, said channeling airflow through the flade duct further comprises channeling a portion of the airflow through the flade duct scroll.

3. A method in accordance with claim 1 wherein the flade system includes a flade duct scroll for channeling a portion of the flade stream, said channeling airflow through the flade duct further comprises channeling the portion of the flade stream through the flade duct scroll to a section of the flade duct positioned upstream of the flade stream augmentor to facilitate increasing an amount of airflow entering the flade stream augmentor.

4. A method in accordance with claim 1 further comprising operating a strut to at least one of increase and decrease the area of a flade burner throat downstream of the augmentor.

5. A method in accordance with claim 1 further comprising channeling a portion of the flade stream around the augmentor to facilitate cooling a burner cavity associated with the augmentor.

6. A flade system for a gas turbine engine, wherein the gas turbine engine includes a core engine including an inner fan duct for channeling airflow through a portion of the core engine, and at least one inner fan section including at least one row of inner fan blades positioned in the inner fan duct, said flade system comprising:

a flade duct surrounding the inner fan duct and defining a flade stream, wherein said flade duct is configured to capture at least a portion of an airflow spillage channeled around the inner fan duct;

at least one fladed fan positioned in said flade duct and producing a flade stream airflow, said fladed fan comprising at least one row of fladed fan blades radially outward of and coupled to the inner fan section such that said fladed fan blades are driven by the inner fan section; and a flade stream augmentor positioned within said flade duct.

7. A flade system in accordance with claim 6 wherein said flade stream augmentor facilitates increasing the thrust of the engine by igniting a portion of said flade stream airflow.

8. A flade system in accordance with claim 6 wherein the engine includes an exhaust nozzle assembly positioned downstream of the core engine, said flade system in flow communication with the exhaust nozzle such that a portion of said flade stream is exhausted through the exhaust nozzle.

9. A flade system in accordance with claim 6 further comprising a flade duct scroll for channeling a portion of said flade stream airflow upstream of said flade stream augmentor.

10. A flade system in accordance with claim 6 wherein said flade stream augmentor comprises a fuel spraybar, a burner, and a burner cavity downstream from said burner, and wherein the engine includes a strut for at least one of increasing and decreasing an area of said burner cavity.

11. A flade system in accordance with claim 6 wherein said flade stream augmentor is configured to create a temperature rise within said flade stream to facilitate reducing nozzle base drag of said engine.

12. A gas turbine engine comprising:

a core engine comprising an inner fan duct for channeling airflow through a portion of said core engine, and at least one inner fan section comprising at least one row of inner fan blades positioned in said inner fan duct; and a flade system comprising a flade duct surrounding said core engine and defining a flade stream, said flade stream facilitates cooling said flade duct from and engine inlet to an engine exhaust nozzle, at least one fladed fan positioned in said flade duct and producing a flade stream airflow, said fladed fan comprising at least one row of fladed fan blades radially outward of and coupled to said inner fan section such that said fladed fan blades are driven by said inner fan section, and a flade stream augmentor positioned within said flade duct.

13. A gas turbine engine in accordance with claim 12 wherein said flade duct is configured to capture at least a portion of an airflow spillage channeled around said inner fan duct.

14. A gas turbine engine in accordance with claim 12 wherein said flade stream augmentor facilitates increasing the thrust of said engine by igniting a portion of said flade stream airflow.

15. A gas turbine engine in accordance with claim 12 further comprising an exhaust nozzle assembly positioned downstream of and in flow communication with said core engine and said flade system, said exhaust nozzle assembly for channeling exhausted airflow therethrough.

16. A gas turbine engine in accordance with claim 12 further comprising a flade duct scroll for channeling a portion of said flade stream airflow upstream said flade stream augmentor.

17. A gas turbine engine in accordance with claim 12 wherein said flade stream augmentor comprises a fuel spraybar, a burner, and a burner cavity downstream from said burner, and wherein said engine further comprises a strut for at least one of increasing and decreasing an area of said burner cavity.

18. A gas turbine engine in accordance with claim 12 wherein said flade stream augmentor is configured to create a temperature rise within said flade stream to facilitate reducing nozzle base drag of said engine.

* * * * *

UNITED STATES PATENT AND TRADEMARK OFFICE
CERTIFICATE OF CORRECTION

| | | |
|---|---|---|
| PATENT NO. | : 7,188,467 B2 | Page 1 of 1 |
| APPLICATION NO. | : 10/955614 | |
| DATED | : March 13, 2007 | |
| INVENTOR(S) | : Johnson | |

It is certified that error appears in the above-identified patent and that said Letters Patent is hereby corrected as shown below:

In Claim 12, column 7, line 13, delete "duct from and" and insert therefor -- duct from an --.

Signed and Sealed this

Eighteenth Day of September, 2007

JON W. DUDAS
*Director of the United States Patent and Trademark Office*